UNITED STATES PATENT OFFICE.

PETER R. GOTTSTEIN, OF HOUGHTON, MICHIGAN.

IMPROVEMENT IN CANDLES FOR MINERS' USE.

Specification forming part of Letters Patent No. 101,857, dated April 12, 1870; Reissue No. 7,777, dated July 3, 1877; application filed December 18, 1876.

*To all whom it may concern:*

Be it known that I, PETER R. GOTTSTEIN, of Houghton, in the county of Houghton and State of Michigan, have invented a new and useful Process for Making Candles for Miners' Use, of which the following is a specification:

This invention relates to that class of candles known as "dipped" candles; and it consists in using stearine in a very warm room, instead of tallow.

Owing to the rapid and unequal cooling of stearine, and its liability to crack in cooling when used in the same manner as tallow for dipped candles, it has hitherto been considered impracticable to make stearine candles otherwise than by molding.

In carrying out my invention the room in which the candles are made should be kept at a temperature of from 75° to 100° Fahrenheit, from the time the wicks are first dipped until the finished candles become thoroughly hardened. As many wicks as desired are then dipped in a vat of hot stearine until they are covered with stearine and about one-quarter of an inch thick, and then allowed to become entirely cool. Then the workman is to take such a number of blocks of wicks, dipped and cooled as aforesaid, as he can dip in succession so rapidly that they will not harden between dips, and dip them in succession rapidly until the candles attain the desired size. I have found by experience that four or six blocks of wicks are all that should be taken at once.

This process gives the candle a comparatively cool core, and prevents the surface of the finished candle from cooling faster than the inside, thus avoiding the cracking due to unequal contraction while cooling. It also makes a much harder candle than is made by molding.

I am aware that dipped tallow candles are old, and that stearine molded candles are old; and I do not claim either a dipped candle or a stearine candle.

I claim as my invention—

The process of making dipped candles of stearine, by keeping the room at a high temperature, allowing the dip to cool when about one-quarter of an inch thick, and then dipping rapidly until finished, substantially as described.

P. R. GOTTSTEIN.

Witnesses:

EDWIN F. CONELY,

FRANK D. ANDREWS.